United States Patent [19]
Lopez

[11] Patent Number: 5,484,755
[45] Date of Patent: * Jan. 16, 1996

[54] PROCESS FOR PREPARING A DISPERSED GROUP VIB METAL SULFIDE CATALYST

[76] Inventor: Jaime Lopez, 872 Dover Cir., Benicia, Calif. 94510

[*] Notice: The portion of the term of this patent subsequent to Apr. 25, 2006, has been disclaimed.

[21] Appl. No.: 294,182

[22] Filed: Aug. 22, 1994

Related U.S. Application Data

[63] Continuation of Ser. No. 741,855, Aug. 6, 1991, abandoned, which is a continuation of Ser. No. 548,157, Jul. 5, 1990, Pat. No. 5,164,075, which is a continuation-in-part of Ser. No. 388,790, Sep. 5, 1989, Pat. No. 4,970,190, Ser. No. 252,839, Sep. 30, 1988, abandoned, and Ser. No. 275,235, Nov. 22, 1988, abandoned, which is a continuation-in-part of Ser. No. 767,822, Aug. 21, 1985, abandoned, which is a continuation-in-part of Ser. No. 527,414, Aug. 29, 1983, Pat. No. 4,557,821, said Ser. No. 388,790 is a continuation-in-part of Ser. No. 527,414, said Ser. No. 252,839 is a continuation-in-part of Ser. No. 941,456, Dec. 15, 1986, Pat. No. 4,857,496, which is a continuation-in-part of Ser. No. 767,767, Aug. 21, 1985, abandoned, which is a continuation-in-part of Ser. No. 527,414.

[51] Int. Cl.$^6$ ................................ B01J 27/051
[52] U.S. Cl. ............................ 502/219; 502/220
[58] Field of Search ........................ 502/219, 220

[56] References Cited

U.S. PATENT DOCUMENTS

| | | | |
|---|---|---|---|
| 3,663,431 | 5/1972 | Wagner | 502/220 |
| 3,965,041 | 6/1976 | van Klinken et al. | 502/220 |
| 4,557,821 | 12/1985 | Lopez et al. | 208/108 |
| 4,710,486 | 12/1987 | Lopez et al. | 502/219 |
| 4,762,812 | 8/1988 | Lopez et al. | 502/26 |
| 4,824,821 | 4/1989 | Lopez et al. | 502/220 |
| 4,857,496 | 8/1989 | Lopez et al. | 502/220 |
| 4,970,190 | 11/1990 | Lopez et al. | 502/220 |

*Primary Examiner*—Asok Pal
*Assistant Examiner*—Walter D. Griffin
*Attorney, Agent, or Firm*—W. Keith Turner; Alan W. Klaassen

[57] ABSTRACT

High activity slurry catalysts for hydroprocessing heavy hydrocarbon oils are produced from Group VIB metal compounds by sulfiding an aqueous mixture of the metal compound with from greater than about 8 to about 14 SCF of hydrogen sulfide per pound of Group VIB metal.

2 Claims, 5 Drawing Sheets

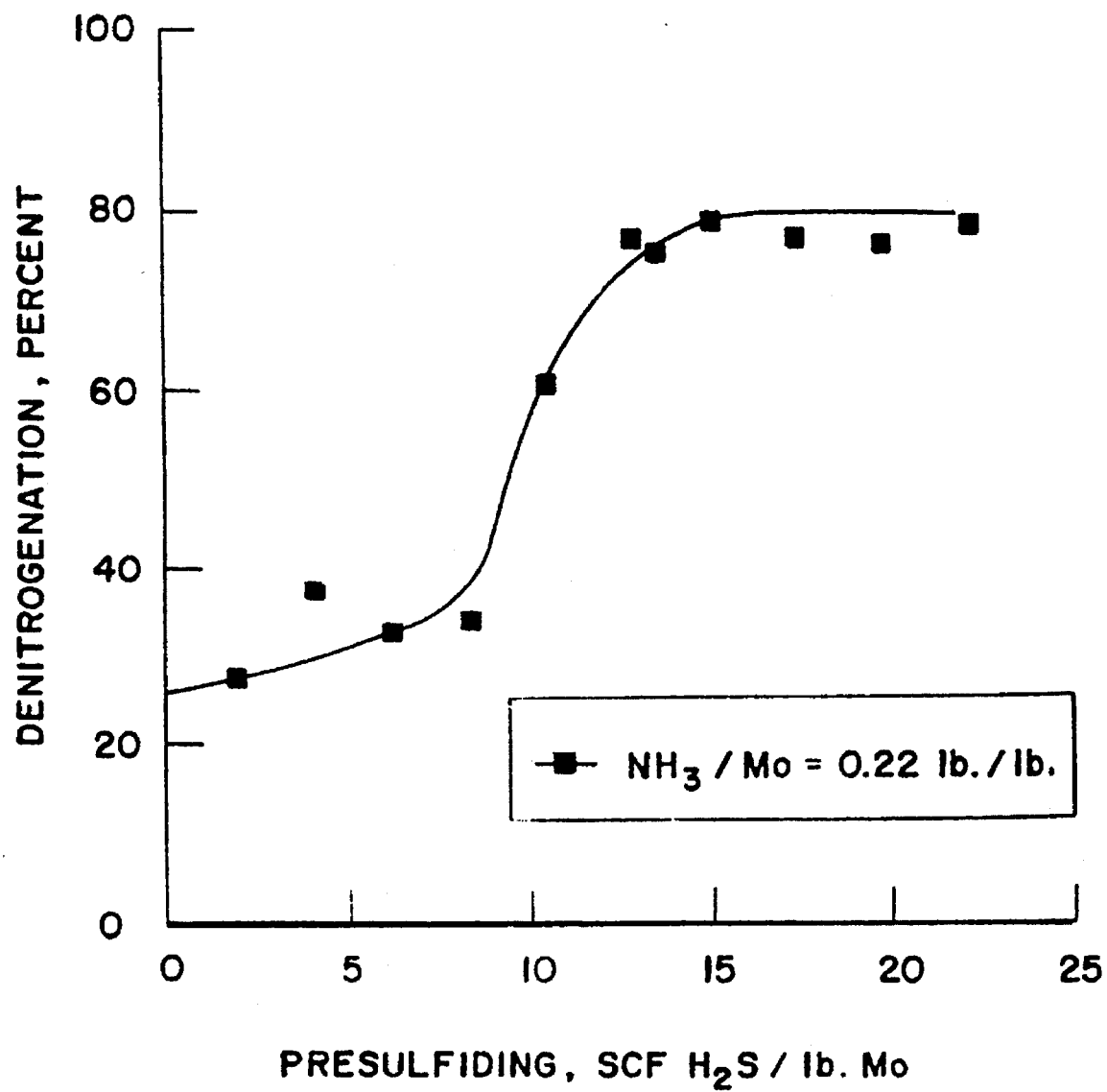
FIG_1

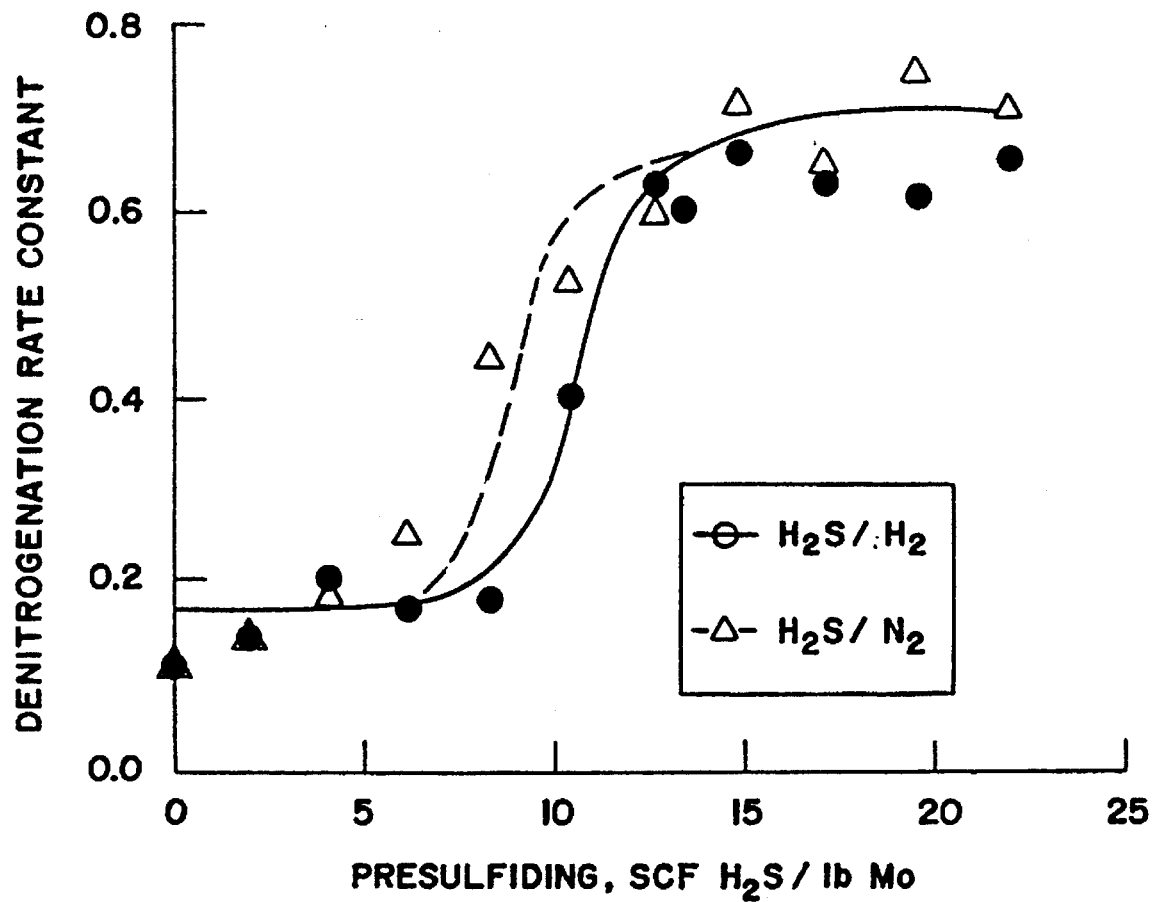
FIG_2

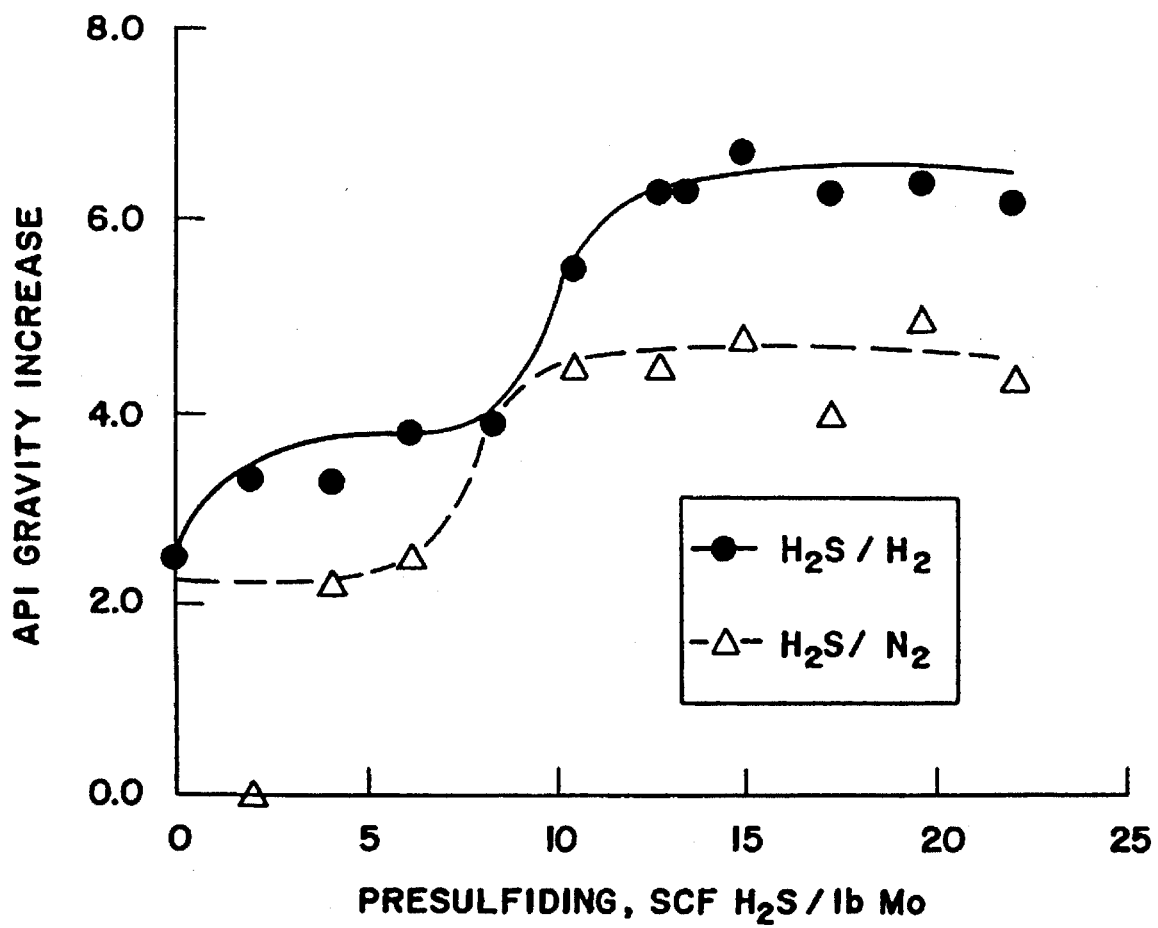
FIG_3

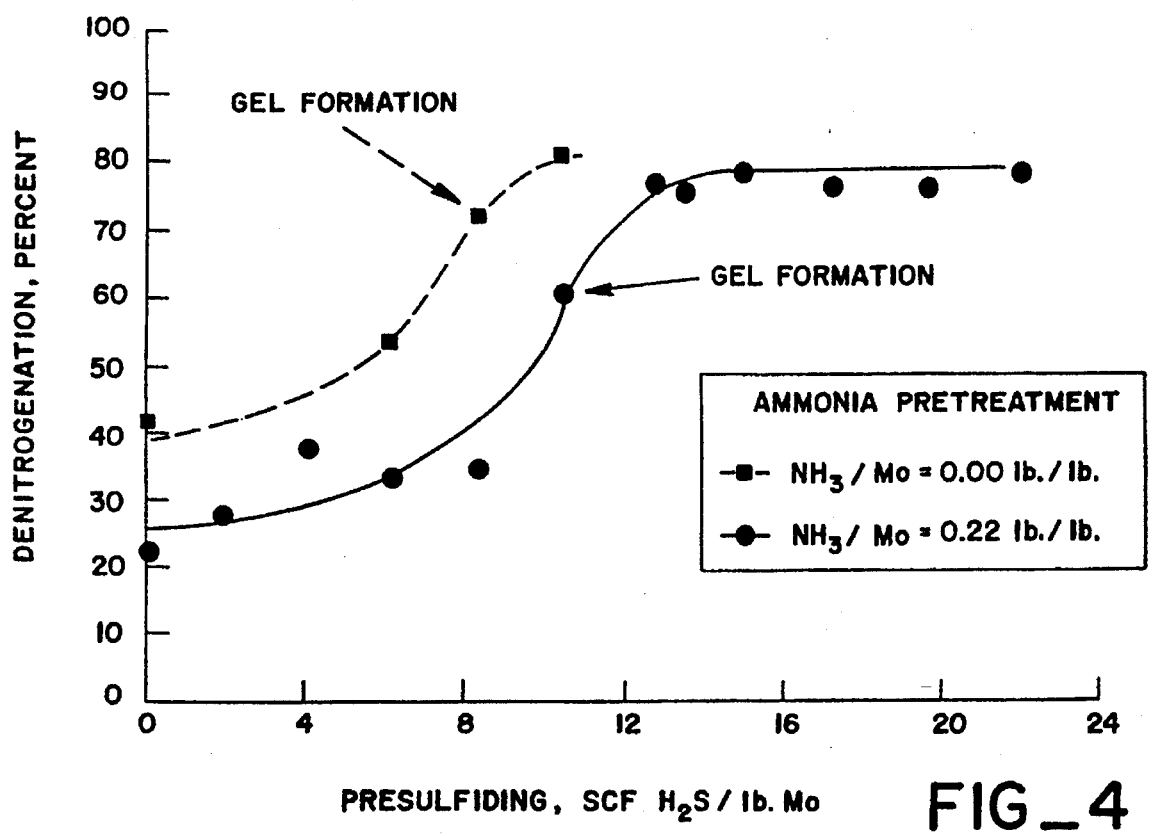
FIG_4

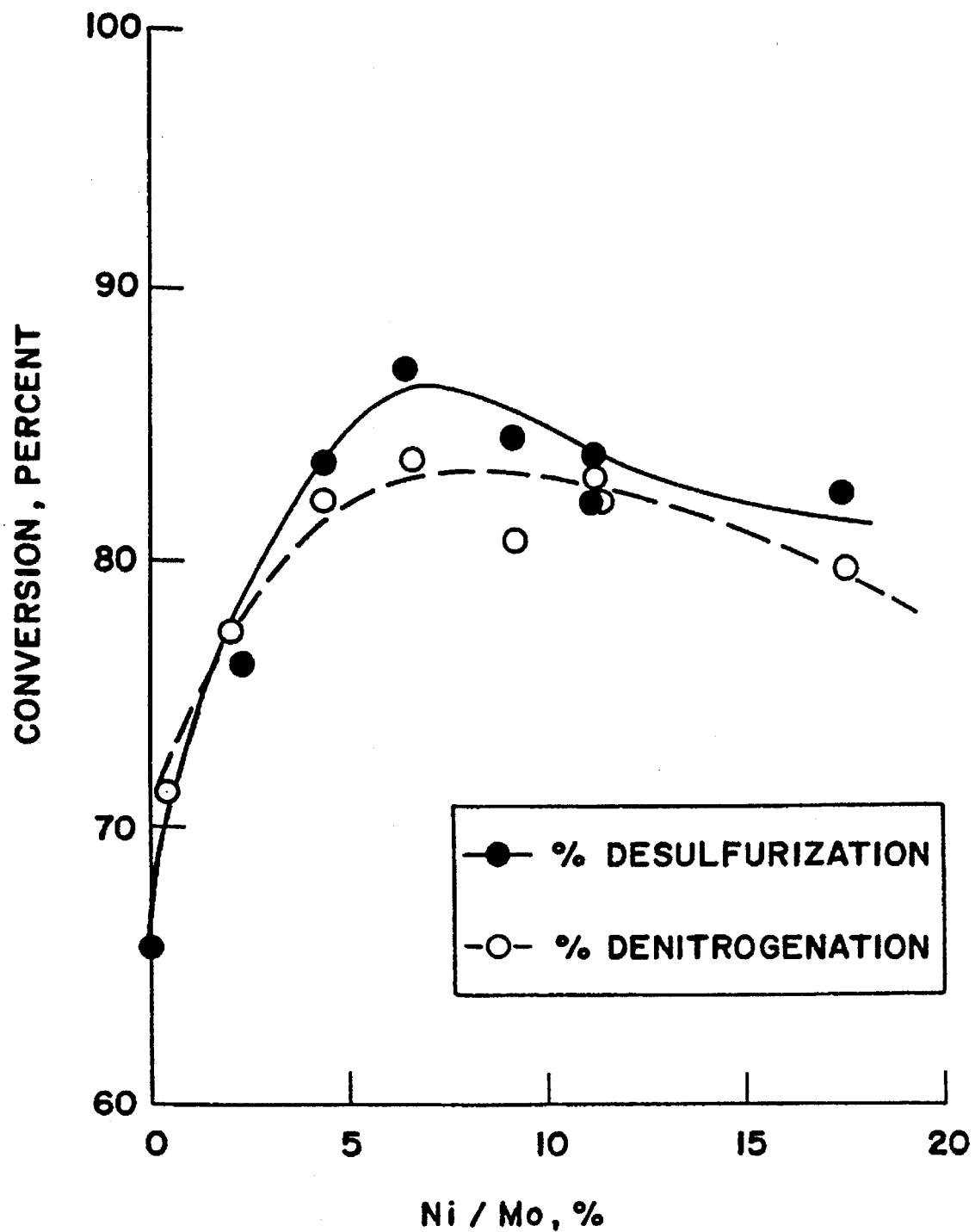
FIG_5

PROCESS FOR PREPARING A DISPERSED GROUP VIB METAL SULFIDE CATALYST

CROSS REFERENCES TO RELATED APPLICATIONS

This is a continuation of application Ser. No. 741,855 filed Aug. 6, 1991, now abandoned, which is a continuation of application Ser. No. 548,157, filed Jul. 5, 1990, now U.S. Pat. No. 5,164,075, which is a continuation-in-part of part of U.S. Ser. No. 388,790 filed Sep. 5, 1989, now U.S. Pat. No. 4,970,190, which is a continuation-in-part of U.S. Ser. No. 527,414 filed Aug. 29, 1983 (now U.S. Pat. No. 4,557,821). This application is also a continuation-in-part of U.S. Ser. No. 252,839 filed Sep. 30, 1988, now abandoned, which is a continuation-in-part of U.S. Ser. No. 941,456 filed Dec. 15, 1986 (now U.S. Pat. No. 4,857,496), which is a continuation-in-part of U.S. Ser. No. 767,767 filed Aug. 21 1985 (abandoned) which is a continuation-in-part of U.S. Ser. No. 527,414 filed Aug. 29, 1983 (now U.S. Pat. No. 4,557,821). This application filed Nov. 22, 1988, now abandoned, which is a contiuation-in-part of U.S. Ser. No. 767,822 filed Aug. 21, 1985 (abandoned) which is a continuation-in-part of U.S. No. 527,414 filed Aug. 29, 1983 (now U.S. Pat. No. 4,557,821). Related applications include U.S. Ser. No. 767,760 filed Aug. 21, 1985 (now U.S. Pat. No. 4,824,821) also a continuation-in-part of U.S. Ser. No. 527,414 filed Aug. 29, 1983 now U.S. Pat. No. 4,557,821; U.S. Ser. No. 767,768 filed Aug. 21, 1985 (now U.S. Pat. No. 4,710,486), also a continuation-in-part of U.S. Ser. No. 527,414 filed Aug. 21, 1985 (now U.S. Pat No. 4,762,812), also a continuation-in-part of U.S. Ser. No. 527,414 filed Aug. 29, 1983, now U.S. Pat. No. 4,575,821.

BACKGROUND OF THE INVENTION

This invention relates to the catalytic hydroprocessing of heavy hydrocarbon oils including crude oils, heavy crude oils and residual oils as well as refractory heavy distillates, including FCC decanted oils and lubricating oils. It also relates to the hydroprocessing of shale oils, oils from tar sands, and liquids derived from coals. The invention relates to a catalyst for the hydroprocessing of such hydrocarbonaceous feedstocks, the use of such catalysts, and the preparation of such catalysts.

In U.S. Ser. No. 527,414 filed Aug. 29, 1983 (now U.S. Pat. No. 4,557,821), a parent application of the present application, a catalytic means of hydroprocessing heavy oils was revealed which employs a circulating slurry catalyst. The catalyst comprised a dispersed form of molybdenum disulfide prepared by reacting aqueous ammonia and molybdenum oxide to form an aqueous ammonium molybdate which was reacted with a dosage of hydrogen sulfide to form a precursor slurry. The precursor slurry was mixed with feed oil, hydrogen and hydrogen sulfide and heated under certain conditions. A variety of dosages of hydrogen sulfide expressed as SCF of hydrogen sulfide per pound of molybdenum were taught to be useful in forming the precursor slurry (Column 3). From 2–8 SCF/LB were preferred (Column 4). It was found to be necessary to mix the slurry with oil in the presence of both hydrogen and hydrogen sulfide in order to obtain a catalytically active slurry catalyst (Columns 11–12). The oil-slurry mixture was then sulfided with hydrogen and hydrogen sulfide at at least two temperatures (Column 24) under certain conditions. The feed and catalyst, with water added were charged to the hydroprocessing reactor. Water introduction was deemed beneficial (Columns 26–27) for certain purposes, as was nickel addition to the slurry catalyst (Columns 42–44).

In U.S. Ser. No. 941,456 filed Dec. 15, 1986 (U.S. Pat. No. 4,857,496), a parent application of the present application, is described a sulfiding process in which there are two or three heating steps providing time-temperature sequences to complete the preparation of the final catalyst prior to flowing the feed to the higher temperature hydroprocessing reactor zone. Each sulfiding step was operated at a temperature higher than its predecessor. Ammonia was removed from an intermediate stage of catalyst preparation before the addition of feed oil and further sulfiding.

U.S. Ser. No. 767,760 filed Aug. 21, 1986, (U.S. Pat. No. 4,824,821), also a continuation-in-part of U.S. Ser. No. 527,414 filed Aug. 29, 1983 (U.S. Pat. No. 4,575,821), describes the promotion of a Group VIB slurry catalyst by the addition of a Group VIII metal such as nickel or cobalt, to the aqueous ammonia compound after sulfiding is underway.

U.S. Ser. No. 767,768 filed August 21, 1985 (U.S. Pat. No. 4,710,486) also a continuation-in-part of U.S. Ser. No. 527,414 filed Aug. 29, 1983 (U.S. Pat. No. 4,575,821), describes the specific regulation of the amount of sulfiding occurring in intermediate temperature sulfiding steps by stoichiometric replacement of oxygen associated with the Group VIB metal with sulfur up to fifty to ninety-five percent replacement. At least three stages of sulfiding were preferred with additional replacement of oxygen by sulfur in the high temperature step.

U.S. Ser. No. 767,821 filed Aug. 21, 1985 (U.S. Pat. No. 4,762,812), also a continuation-in-part of U.S. Ser. No. 527,414 filed Aug. 29, 1983 (U.S. Pat. No. 4,575,821), described a process for the recovery of spent molybdenum catalysts.

A parent application of the present application, U.S. Ser. No. 275,235 filed Nov. 22, 1988, now abandoned described a Group VIB metal sulfide slurry catalyst for hydroprocessing heavy oils or residual oil which has a pore volume of 10–300 angstrom radius pore size range of at least 0.1 cc/g.

The specifications of all of the foregoing U.S. Patent applications are incorporated herein by reference as if fully set forth in ipsis verbis.

FIELD OF THE INVENTION

The present invention relates to the processing of heavy oils characterized by low hydrogen to carbon ratios and high carbon residues, asphaltenes, nitrogen, sulfur and metal contents. From the aforementioned patent specifications it is learned that to produce active slurry catalyst from Group VI oxides, both ammonia pretreating and presulfiding in aqueous media are required. In an ammonia pretreatment step, molybdenum oxide, for example, is treated with aqueous ammonia to form a water soluble ammonium molybdate under certain conditions, typically: at 80° F. to 450° F.; at atmospheric to 400 psi; and ammonia to molybdenum weight ratios of 0.1 to 0.16 pounds of ammonia per pound of molybdenum. In a presulfiding step the product of ammonia pretreatment is contacted with a hydrogen sulfide-containing gas stream at, typically, the aforementioned temperatures and pressures. The amount of sulfiding is controlled by specifying the ratio of hydrogen sulfide gas, measured as Standard Cubic Feet (SCF) contacted per pound of molybdenum charged. This ratio is defined as the "sulfiding extent" or "dosage." A catalyst is obtained when the sulfiding extent or dosage is controlled to 0.5 or greater SCF of hydrogen sulfide per pound of molybdenum, most preferably 2 to 8 SCF per pound. It is found that by varying the ammonia to molybdenum ratio and the hydrogen sulfide dosage in the preparation of the catalyst precursor, catalyst activity, catalyst slurry concentration and particle size can be controlled. Once the ammonia product is presulfided, the precursor slurry can be mixed with feed oil, hydrogen and hydrogen sulfide. The mixture is heated at a pressure between 500 and 5,000 psi such that it is within the temperature range of 150° to 350° F. for a duration of 0.05 to 0.5 hours. The mixture is further heated so that it is within the range of 351° to 750° F. for a duration of 0.5 to 2 hours. The hydroprocess includes the recycling to the hydroprocessing zone of a hydrogen-hydrogen sulfide containing stream separated from the hydroprocessing zone wherein the hydrogen sulfide partial pressure is at least 20 psi and the circulation of hydrogen sulfide is greater than 5 SCF per pound of molybdenum.

For the processing of heavy oils characterized by low hydrogen to carbon ratios and high carbon residues, asphaltenes, nitrogen, sulfur and metal contents, it would be advantageous if the parameters for the preparation of a high activity slurry catalyst were available.

SUMMARY OF THE INVENTION

The present invention provides a high activity catalyst which is prepared by dispersing a slurry catalyst in a hydrocarbonaceous oil for hydroprocessing. The present process has the advantage over conventional processes of achieving higher conversion of nitrogen, sulfur, metals and bottoms than fixed bed resid desulfurization, thermal or existing slurry processes.

The process comprises: sulfiding an aqueous mixture of a Group VIB metal compound with a gas containing hydrogen sulfide to a dosage greater than about 8, preferably from greater than about 8 up to 14 SCF of hydrogen sulfide per pound of Group VIB metal to form a slurry; and mixing the slurry with feed oil and a hydrogen-containing gas at elevated temperature and pressure. Twelve SCF hydrogen sulfide corresponds to about 1 mole of molybdenum per 3 moles of sulfur.

The invention comprises the preparation of a dispersed Group VIB metal sulfide catalyst by sulfiding an aqueous mixture of a Group VIB metal compound with a gas containing hydrogen and hydrogen sulfide, to a dosage from greater than about 8 to about 14 SCF of hydrogen sulfide per pound of Group VIB metal to form a slurry; adding a Group VIII metal compound to the slurry; and mixing the slurry and Group VIII metal compound with a feed oil and a hydrogen-containing gas at elevated temperature and pressure. The inclusion of Group VIII metal compounds improves the denitrogenation capability of the slurry catalyst.

BRIEF DESCRIPTION OF THE DRAWINGS

FIG. 1 shows the denitrogenation activity of various catalysts pretreated at essentially the same ammonia to molybdenum ratio but sulfided to various extents.

FIGS. 2–3 show the denitrogenation rate constant, and API gravity increase as a function of the extent of sulfiding, respectively.

FIG. 4 indicates the molybdenum sulfided catalyst precursors which yield active catalysts are aqueous gels.

FIG. 5 shows the benefit of promoting the active catalysts of this invention with a Group VIII metal.

DETAILED DESCRIPTION OF THE PREFERRED EMBODIMENTS OF THE INVENTION

I have found that the activity of the final Group VIB metal catalyst is a special function of the activation conditions used to transform the starting Group VIB compound to the final, active catalyst. In the following I will by way of exemplification and discussion refer to the preferred Group VIB metal, molybdenum and its compounds as typical of my slurry catalyst. However, the reference to molybdenum is by way of preference and exemplification only, and is not intended to exclude other Group VIB metals and compounds thereof.

As an improvement of other methods of preparing the catalyst of the present invention I have found that activation of the catalyst occurs by sulfiding the aqueous solution formed by pretreatment with aqueous ammonia to at least 8 SCF of hydrogen sulfide per pound of molybdenum. With this degree of sulfiding it is no longer necessary to have hydrogen sulfide present in the recycled gas stream during hydroprocessing. Furthermore, the activation of the catalyst is achieved relatively independent of the ammonia-to-molybdenum ratio used to form the aqueous mixture.

Sulfiding

Catalyst activity is achieved when the extent of sulfiding is from greater than about 8 up to about 14 SCF of hydrogen sulfide per pound of molybdenum. This sulfiding dosage produces a catalyst precursor characterized by a sulfur-to-molybdenum mole ratio of about 3. The effect of sulfiding on catalyst activation is demonstrated in the first set of examples. In these examples, two types of catalyst were prepared by first reacting molybdenum oxide with aqueous ammonia at identical conditions and with the same amount of ammonia. The aqueous mixture was then sulfided in the absence of added oil. The catalysts differ in the extent of sulfiding provided. The first type was sulfided to a dosage of 2.7 SCF of hydrogen sulfide per pound of molybdenum (SC-21). The second type of catalyst was sulfided beyond 12 SCF of hydrogen sulfide per pound of molybdenum (SC-25-2). The conditions used to pretreat with ammonia and sulfide these catalysts are summarized below.

| CATALYST PREPARATION: | | |
|---|---|---|
| Catalyst, SC: | -21 | -25-2 |
| Pretreatment | | |
| NH$_3$/Mo, lb/lb. | 0.23 | 0.23 |
| Sulfiding: | | |
| H$_2$S/Mo, SCF/lb. | 2.7 | 14.0 |
| Temperature, °F. | 150 | 150 |
| Pressure, psig. | 30 | 400 |
| Sulfiding Gas: | | |
| Composition, % | | |
| H$_2$S | 8–10 | 8–10 |
| Hydrogen | 88–90 | 88–90 |

Tables IA–IB compare the results of two runs performed on the same feedstock and at identical conditions with both the undersulfided catalyst SC-21 and the catalyst, SC-25-2.

Catalyst activation is evident from the hydrogen consumption, denitrogenation, desulfurization, demetallation and 975° F.+ conversion results. Hydrogen consumption was increased from 584 to 1417 SCF per barrel, desulfurization from 38 to 89 percent, denitrogenation from 21 to 84 percent, demetallation from 66 to 99 percent and 975° F.+ conversion from 77 to 92 percent.

TABLE IA

OPERATING CONDITIONS

| Feedstock | ←Hvy. Arabian→ | |
| --- | --- | --- |
| Catalyst | SC-21 | SC-25-2 |
| Cat. to oil ratio | 0.0213 | 0.0193 |
| Molybdenum, wt./wt. | | |
| LHSV | 0.59 | 0.56 |
| Temperatures, F. | | |
| Pretreater: | 682. | 682. |
| Reactor: | 808. | 811. |
| Pressures: | | |
| Rx. Inlet, psig: | 2842. | 2748. |
| H$_2$ partial pressures, psi | 1958. | 1498. |
| H$_2$S partial pressure, psi | 150. | 365. |
| Recycle gas: | | |
| Gas rate, SCF/Bbl. | 6650. | 5419. |

TABLE IB

CONVERSIONS

| Feedstock | ←Hvy. Arabian→ | |
| --- | --- | --- |
| Conversions: | | |
| Hydrogen Consumption, SCFB: | 584. | 1417. |
| Conversion: | | |
| Vacuum Resid, % as 975° F. + vol % | 53.7 | 71.4 |
| Total: | 76.6 | 92.1 |
| Desulfurization, % | 38. | 89. |
| Denitrogenation, % | 21. | 84. |
| Demetalation, % | 66. | 99. |
| Nickel Removal, % | 61. | 99. |
| Vanadium Removal, % | 67. | 99. |

Catalysts sulfided at higher sulfiding dosages than about 12–14 SCF of hydrogen sulfide per pound of molybdenum yield neither higher nor lower catalyst activities when tested in batch operations. FIG. 1 shows the denitrogenation activities various catalysts pretreated at essentially the same ammonia to molybdenum ratio but presulfided with various dosages of hydrogen sulfide. These pretreated and sulfided catalysts were screened in a batch reactor with no added hydrogen sulfide and with a feed that contained little sulfur. No further sulfiding was provided to the catalyst aside from that performed in the presulfiding step in the absence of oil. The results shown in FIG. 1 illustrate the criticality of sulfiding this catalyst to 8–14 SCF H$_2$S per pound of molybdenum.

Ammonia Pretreatment

The catalysts were pretreated over a wide range of ammonia to molybdenum ratios, from materials prepared without ammonia (0 ammonia to molybdenum ratio) to catalysts pretreated to 0.35 pound of ammonia per pound of molybdenum. The results indicate that catalyst activity is independent of the ammonia to molybdenum ratio used to form the slurry catalyst. Although a slight optimum when the ammonia to molybdenum ratio was about 0.16 was observed, catalysts were produced even when aqueous slurries of molybdenum oxide were appropriately sulfided without ammonia pretreatment. However, pretreatment with ammonia is preferred because better control of the particle size is achieved when the molybdenum oxide is dissolved in aqueous ammonia.

Hydrogen Sulfide Requirements During Hydroprocessing

In prior work it was required to include the recycling of a hydrogen-hydrogen sulfide stream separated from the hydroprocessing zone wherein the hydrogen sulfide partial pressure was at least 20 psi and the circulation of hydrogen sulfide was greater than 5 SCF per pound of molybdenum. However, in the present invention, by increasing the sulfiding dosage, in the absence of oil, to values of from about greater than 8 to about 14 SCF of hydrogen sulfide per pound of molybdenum, not only are active slurry catalysts produced, but the need of having hydrogen sulfide present in the recycled gas stream is eliminated.

Table II shows and compares various runs performed with both undersulfided catalyst and the catalysts of this invention. As can be observed, stable and high activity catalysts have been obtained over a wide range of hydrogen sulfide partial pressures and circulation rates at the reactor inlet. Active catalysts, have been obtained at hydrogen sulfide partial pressures from 271 psi to 3.5 and circulation rates from 78 to as low as 5 SCF of hydrogen sulfide per pound of molybdenum.

Effect of Hydrogen Partial Pressure During Sulfiding

In the examples given above all the catalysts were sulfided with hydrogen sulfide contained in a hydrogen gas. I have now demonstrated that active molybdenum sulfide catalysts can be produced when the sulfiding step is performed in the absence of hydrogen. To study this effect a series of catalysts were prepared at various sulfiding dosages with a gas containing no hydrogen. The catalysts were prepared using conventional sulfiding techniques described in the background section, except that the sulfiding gas stream contained no hydrogen. The sulfiding gas consisted of 20% by mole of hydrogen sulfide and 80% nitrogen. The resulting catalysts were tested in a batch microactivity unit for their denitrogenation, hydrogenation, and desulfurization activities. The catalysts were tested at typical catalyst conditions with the gas charge consisting of pure hydrogen. The results from this study were compared to those obtained with catalysts sulfided under hydrogen partial pressure.

FIGS. 2–3 show the denitrogenation rate constant, and API gravity increase as a function of the extent of sulfiding. Also contained in these figures are similar results obtained with catalysts sulfided with a hydrogen sulfide and hydrogen gas mixture having the same hydrogen sulfide composition as that used in this study. From the denitrogenation results, it is evident that active catalysts were obtained regardless of the hydrogen partial pressure.

Although in both cases active catalysts were produced, activation of the slurry catalyst occurred at a lower sulfiding dosage, i.e. at 8–10 SCF hydrogen sulfide per pound of molybdenum, when the catalysts were produced under no hydrogen partial pressure. This value was slightly lower than that sulfiding dosage required to activate the catalyst when it is activated under hydrogen partial pressure, i.e. at 12–14 SCF of hydrogen sulfide per pound of molybdenum. Higher API gravities and amounts of hydrogen used to upgrade the liquid product were obtained with catalysts sulfided under hydrogen partial pressure.

system in continuous operations was found to decrease as the catalyst precursor was sulfided above about 14 SCF of hydrogen sulfide per pound of molybdenum dosage.

For catalyst pretreated at an ammonia to molybdenum weight ratio of 0.23, incipient gel formation occurs at a

TABLE II

SLURRY CATALYTIC PROCESSING OF RESIDS WITH HIGH ACTIVITY SLURRY SYSTEMS

| | | | | | | | |
|---|---|---|---|---|---|---|---|
| Run Hour | — | — | 173 | 150 | 173 | 341 | 150 |
| Feedstock | | ←Heavy Arabian 650 F.+→ | | | | ←Hondo 650° F.+→ | |
| Heavy Feed: | 100. | 100. | 100. | 100. | 100. | 100. | 91.25 |
| Surfactant: | 0.00 | 0.00 | 0.00 | 0.00 | 0.00 | 0.00 | 8.75 |
| Catalyst | SC-21-1 | SC-25-2 | SC-27-3 | SC-27-3 | SC-27-3 | SC-28-3 | SC-28-3 |
| Operating Conditions | | | | | | | |
| Cat. to Oil Ratio | | | | | | | |
| Molybdenum, % wt./wt. | 2.13 | 1.91 | 1.75 | 1.55 | 1.77 | 1.77 | 1.11 |
| Pretreatment, lb. NH3/lb. Mo. | 0.23 | 0.23 | 0.23 | 0.23 | 0.23 | 0.23 | 0.23 |
| Sulfiding, SCF H2S/lb. Mo. | 2.7 | 14.0 | 13.5 | 13.5 | 13.5 | 13.5 | 12.5 |
| Nickel, % wt./wt. | 0.00 | 0.00 | 0.00 | 0.00 | 0.00 | 0.00 | 0.10 |
| LHSV | 0.590 | 0.560 | 0.694 | 0.698 | 0.495 | 0.501 | 0.192 |
| Temperatures | | | | | | | |
| Pretreater, F. | 682. | 682. | 685. | 685. | 678. | 678. | 440. |
| Reactor, F. | 808. | 811. | 813. | 826. | 837. | 839. | 836. |
| Pressure, Inlet, psig | 2842. | 2748. | 2500. | 2500. | 2500. | 2500. | 2500. |
| H2 partial pressure: | | | | | | | |
| Reactor Avg., | 1958. | 1498. | 1665. | 1846. | 1830. | 1795. | 2094. |
| Reactor Gas: | | | | | | | |
| Gas Rate, SCF/Bbl | 6650. | 5419. | 6656. | 6409. | 7494. | 7494. | 14182. |
| H2S Partial Pressure, psi. | 167. | 271. | 68. | 22. | 28. | 32. | 3.5 |
| H2S per Pound of Cat., SCF/# | 52. | 78. | 30. | 11. | 13. | 18. | 5. |
| Conversions: | | | | | | | |
| Hydrogen Consumptions: | | | | | | | |
| SCF/Bbl | 584. | 1417. | 1279. | 1304. | 1356. | 1306. | 1838. |
| Desulfurization, wt. %: | 38.2 | 89.1 | 89.5 | 87.3 | 87.4 | 85.9 | 98.7 |
| Denitrification, wt. %: | 21.4 | 83.3 | 80.8 | 73.0 | 71.3 | 61.5 | 99.2 |
| Demetalation: | 65.6 | 99.3 | 98.3 | 98.4 | 98.4 | 98.5 | 100.0 |
| Conversion of 1000 F.+, % | 53.7 | 71.4 | 62.0 | 69.9 | 78.5 | 82.8 | 100.0 |
| Yields: | | | | | | | |
| Percent by volume, fresh feed: | | | | | | | |
| LPG, C3/C4 | 2.72 | 4.28 | 3.58 | 3.90 | 6.09 | 5.71 | 14.15 |
| C5–350 F. Yield | 9.96 | 15.77 | 7.33 | 15.27 | 14.24 | 15.94 | 35.06 |
| 350–650 F. Yield | 20.10 | 30.77 | 28.76 | 28.77 | 35.88 | 33.69 | 43.61 |
| 650–1000 F. Yield | 43.68 | 41.21 | 48.66 | 45.71 | 45.05 | 43.84 | 26.91 |
| 1000 F. + Residual | 26.00 | 16.08 | 18.23 | 14.43 | 10.33 | 8.75 | 0.00 |
| Total | 102.46 | 108.12 | 106.56 | 108.14 | 108.14 | 107.93 | 119.81 |

Effect of Sulfiding On Continuous Operations

I have demonstrated that activation of the slurry catalyst occurs by sulfiding aqueous solutions or mixtures of ammonia molybdate and molybdenum oxides. Activity increases as the extent of sulfiding is increased. Maximum activity is obtained when the extent of sulfiding is about 12 SCF of hydrogen sulfide per pound of molybdenum. Catalyst precursors sulfided at higher sulfiding dosages than about 14 SCF of hydrogen sulfide per pound of molybdenum produce neither higher nor lower activities when tested in batch operations. Because the difference between batch and continuous operations is important, the effect of sulfiding dosage on the activity of the system was studied in continuous operation on heavy oil feeds. Similar to the results in batch operations, maximum catalyst activation occurred when the catalyst was sulfided to a value of about 12 SCF of hydrogen sulfide per pound of molybdenum. But unlike the results obtained in batch reactor studies, the activity of the catalyst sulfiding dosage of about 12–14 SCF of hydrogen sulfide per pound of molybdenum. The effect of increasing the sulfiding dosage beyond this dose is to thicken the catalyst precursor aqueous gel. No further sulfur uptake is believed to be achieved by increasing the sulfiding process beyond this dosage. While I do not endorse nor intend to be limited by any theory, the loss of activity observed in the continuous operation at higher sulfiding dosages is believed to be caused by the larger particles produced at higher sulfiding dosages. Consequently, catalyst activity loss at higher sulfiding dosages is believed to be due both to the decrease in reactive volume caused by catalyst buildup and by the lower surface area of the larger catalyst particles.

Composition of Matter

Although the active catalyst precursor is characterized by a sulfur to molybdenum mole ratio of about 3, the final catalyst is believed to be an active form of molybdenum disulfide. Decomposition of the catalyst precursor to the final catalyst occurs at conditions typical of the heavy oil feed preheaters conventially used, and requires no further sulfiding for activation. Furthermore, equilibrium calculations indicate that at the reactor conditions employed in slurry operations, molybdenum disulfide is the favored species.

The molybdenum sulfided catalyst precursors which yield active catalysts are aqueous gels (FIG. 4) which appear as an elastic coherent mass consisting of an aqueous medium in which ultramicroscopic particles are either dispersed or arranged in a network. Furthermore, the catalyst activity is independent of pH since the pH of the resulting aqueous precursor gels varies over a wide range.

Optimum catalyst activity occurs when the catalyst precursor is sulfided to the point of incipient gel formation. Extending the sulfiding above this point produces thick gels which are difficult to disperse into the oil. Thick gels tend to yield large xerogels as the water is vaporized from the gel and the catalyst is transferred to the oil. Large xerogels tend to generate large solid particles when compared with those xerogels prepared from materials produced at the incipient gel formation point. A xerogel is defined as a gel containing little or none of the dispersion medium used.

Promotion By Group VIII Metal

As an enhancement of the denitrogenation activity of the active slurry catalyst of the present invention, it is preferred that a Group VIII metal compound be added to the slurry before mixing the slurry with feed oil and a hydrogen containing gas at elevated temperature and pressure. Such Group VIII metals are exemplified by nickel and cobalt. It is preferred that the weight ratio of nickel or cobalt to molybdenum range from about 1:100 to about 1:2. It is most preferred that the weight ratio of nickel to molybdenum range from about 1:25 to 1:10, i.e., promoter/molybdenum of 4–10 weight percent. The Group VIII metal, exemplified by nickel, is normally added in the form of the sulfate, and preferably added to the slurry after sulfiding at a pH of about 10 or below and preferably at a pH of about 8 or below. Group VIII metal nitrates, carbonates or other compounds may also be used. The advances of Group VIII metal compound promotion are illustrated in the following examples. In view of the high activity of the slurry catalyst of the present invention the further promotion by Group VIII metal compounds is very advantageous.

To demonstrate the promotion effect of adding Group VIII metal to the sulfided catalyst, various amounts of nickel and cobalt were added to a molybdenum sulfided catalyst gel as soluble nickel or cobalt sulfate, and mixed.

The promoted catalysts were then tested for their hydrogenation/denitrogenation and desulfurization activity by evaluating their ability to hydrotreat a high nitrogen and aromatic FCC cycle oil. The cycle oil is characterized by the following inspections:

| FEEDSTOCK INSPECTIONS FCC Heavy Cycle Oil | |
|---|---|
| API Gravity | 4.2 |
| Sulfur, wt. % | 0.54 |
| Nitrogen, ppm | 2928 |
| Carbon, wt. % | 90.24 |
| Hydrogen, wt. % | 8.64 |

FIG. 5 shows the promotion achieved by nickel for the desulfurization and denitrogenation reactions.

Table III summarizes the operating conditions and results from nickel and cobalt promoted active slurry catalysts of my invention.

TABLE III

| Feedstock | ←FCC Heavy Cycle Oil→ | | | | |
|---|---|---|---|---|---|
| Catalyst | | | | | |
| Ammonia Pretreatment | ←0.22 lb NH$_3$/lb. Mo→ | | | | |
| Sulfiding Dosage | ←13.5 SCF H$_2$S/lb. Mo→ | | | | |
| Reactor | | | | | |
| Hydrogen, psi | ←1950→ | | | | |
| H$_2$S, psi | ←0→ | | | | |
| Temperature | ←725° F.→ | | | | |
| Catalyst-to-Oil | | | | | |
| Molybdenum, % fresh feed | ←1.2→ | | | | |
| Nickel as % Mo | 0 | 2.3 | 0 | 9.1 | 0 |
| Cobalt as % Mo | 0 | 0 | 2.1 | 0 | 8.8 |
| Desulfurization, % | 65.6 | 76.2 | 75.0 | 84.5 | 83.6 |
| Denitrogenation, % | 71.2 | 77.6 | 72.2 | 80.8 | 75.4 |
| H$_2$ Consumption, SCF/Bbl. | 1162 | 1155 | 1136 | 1300 | 1075 |

What is claimed is:

1. A process for preparing a dispersed Group VIB metal sulfide catalyst for hydrocarbon oil hydroprocessing comprising:
   (a) treating a Group VIB metal oxide with aqueous ammonia to form a Group VIB metal compound aqueous mixture;
   (b) sulfiding said aqueous mixture of said Group VIB metal compound, with a gas containing hydrogen sulfide to a dosage greater than about 8 SCF of hydrogen sulfide per pound of Group VIB metal, to form a slurry; and
   (c) mixing said slurry with feed oil and a hydrogen-containing gas at a temperature from about 150° F. to 750° F. and a pressure from about 500 psi to 5000 psi.

2. The process according to claim 1 wherein said Group VIB metal oxide is molybdenum oxide.

* * * * *